(12) United States Patent
Song et al.

(10) Patent No.: US 9,398,021 B2
(45) Date of Patent: Jul. 19, 2016

(54) METHOD FOR PROVIDING FILE AGING SERVICE

(71) Applicants: Myung Bean Song, Goyang (KR); Kyeong Ah Lee, Goyang (KR)

(72) Inventors: Myung Bean Song, Goyang (KR); Kyeong Ah Lee, Goyang (KR)

(*) Notice: Subject to any disclaimer, the term of this patent is extended or adjusted under 35 U.S.C. 154(b) by 0 days.

(21) Appl. No.: 14/562,919

(22) Filed: Dec. 8, 2014

(65) Prior Publication Data

US 2015/0172365 A1 Jun. 18, 2015

(30) Foreign Application Priority Data

Dec. 12, 2013 (KR) ........................ 10-2013-0154571

(51) Int. Cl.
*G06F 15/16* (2006.01)
*H04L 29/06* (2006.01)

(52) U.S. Cl.
CPC .................................. *H04L 63/108* (2013.01)

(58) Field of Classification Search
CPC ..... H04L 67/02; H04L 67/28; H04L 67/2809; G06F 17/30817; G06F 17/3089
USPC ......................................... 709/217, 203, 226
See application file for complete search history.

(56) References Cited

U.S. PATENT DOCUMENTS

| 2004/0215718 | A1* | 10/2004 | Kazmi ................ H04L 65/4084 709/203 |
| 2006/0218196 | A1 | 9/2006 | Kurita |
| 2006/0259588 | A1* | 11/2006 | Lerman ............ G06F 17/30017 709/219 |

FOREIGN PATENT DOCUMENTS

| JP | 2002-163182 | 6/2002 |
| KR | 1020000050143 A | 5/2000 |
| KR | 1020070030157 | 3/2007 |
| KR | 1020070047627 A | 7/2007 |
| KR | 10-2009-0000121 | 1/2009 |
| KR | 101158336 B1 | 6/2012 |
| KR | 101258387 B1 | 4/2013 |

OTHER PUBLICATIONS

KIPO Office Action in KR 10-2013-0154571, dated Mar. 28, 2014, with English Translation.

* cited by examiner

*Primary Examiner* — David Lazaro
(74) *Attorney, Agent, or Firm* — Saliwanchik, Lloyd & Eisenschenk (57) ABSTRACT

A method provides an file aging service. In view of the above, it may be possible to inhibit copyrighted literary works from being redistributed and reshared, increase security of contents to be kept confidential, and clean up junk data.

19 Claims, 11 Drawing Sheets

METHOD FOR PROVIDING FILE AGING SERVICE

CROSS-REFERENCE TO RELATED APPLICATION

This application claims the benefit of Korean Patent Application No. 10-2013-0154571, filed on Dec. 12, 2013, at the Korean Intellectual Property Office, the disclosure of which is incorporated herein in its entirety by reference.

FIELD OF THE INVENTION

The present invention relates to a method for providing a file aging service, and more particularly, to a method for managing in one site a lifecycle of a plurality of contents uploaded by a user terminal.

BACKGROUND OF THE INVENTION

Recently, as security becomes more important, a variety of security programs are used and also under development. Further, when personal information or copyrighted literary works are shared, a danger of information leakage becomes increased so that the importance of the security programs continues to be higher.

One of file management methods is to manage database access. Regarding how to manage files, a prior art of Korean registered Patent No. 10-1158336 (published on Jun. 22, 2012) discloses a method in which operations to copy, transfer, inquire and delete personal information are allowed only by authority granted for each virtual space directory.

However, in case of providing services to manage files, the files may be leaked when database is hacked, unless deleting the files. Further, when sharing copyrighted files, there is a possibility that the files may be redistributed by others having no copyright in a digital environment in which it is easy to copy and store the files.

BRIEF SUMMARY

In view of the above, one embodiment of the present invention provides a method for providing a file aging service, capable of managing in one site an extinction time and a deletion of contents uploaded on a website or an application, setting an extinction time on copyrighted literary works so that the literary works are not redistributed or reshared, and advancing an extinction time of programs whose accessibility is lower or that is not executed so that the programs or contents with low store-of-value are not remained as junk data. However, the technical problems of the present embodiment are not limited to the above-described ones and there may be other technical problems.

In order to achieve the above-described technical problems, one embodiment of the present invention includes: receiving content upload event from a user terminal through a content upload server; mapping an extinction time of the content included in the received content upload event and the user terminal to store the mapped result; outputting an aging signal of the content based on a time difference between the extinction time of the content and a current time to transform the content; and transmitting an extinction notice message of the content to the user terminal within a preset time period from the extinction time of the content. The content upload server is characterized in that it transforms the content in accordance with the aging signal.

According to one or more of the above-described solutions of the present invention, it may be possible to inhibit copyrighted literary works from being redistributed and reshared, increase security of contents to be kept confidential, and clean up junk data.

BRIEF DESCRIPTION OF THE DRAWINGS

The above and other objects and features of the present invention will become apparent from the following description of embodiments given in conjunction with the accompanying drawings, in which.

DETAILED DISCLOSURE

Embodiments of the invention will become apparent from the following description of the embodiments with reference to the accompanying drawings, which is set forth hereinafter. The invention may, however, be embodied in many different forms and should not be construed as being limited to the embodiments set forth herein. Furthermore, when it is described that one comprises (or includes or has) some elements, it should be understood that it may comprise (or include or has) only those elements, or it may comprise (or include or have) other elements as well as those elements if there is no specific limitation.

In the entire specification, when a portion is "connected" to another portion, it means that the portions are not only "connected directly" with each other but they are electrically connected with each other by way of another device therebetween. Further, when a portion "comprises" a component, it means that the portion does not exclude another component but further comprises other component unless otherwise described. Furthermore, it should be understood that one or more other features or numerals, steps, operations, components, parts or their combinations can be or are not excluded beforehand.

Hereinafter, the embodiments of the present invention will be described in detail with reference to the accompanying drawings.

Figure 1:
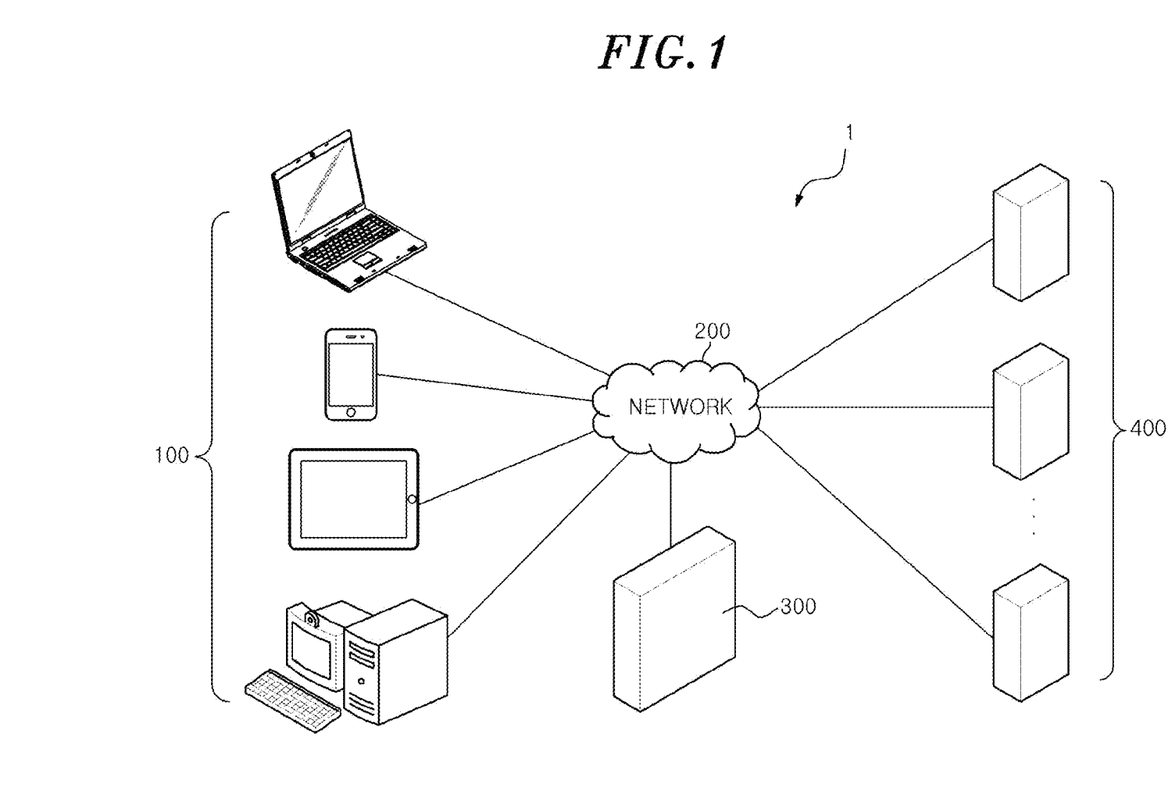
FIG. 1 is a configuration diagram illustrating a system for providing a file aging service in accordance with an embodiment of the present invention.

FIG. 1 is a configuration diagram illustrating a system for providing a file aging service in accordance with an embodiment of the present invention. Referring to FIG. 1, a system for providing a file aging service 1 may include a user terminal 100, a file aging service providing server 300 and a content upload server 400. The system for providing a file aging service 1 illustrated in FIG. 1 is for illustrative purpose only of an embodiment of the present invention, and does not in any way limit the present invention to FIG. 1.

The components in FIG. 1 are generally connected one another through a network 200. For example, as illustrated in FIG. 1, the user terminal 100 and file aging service server 300 may be connected each other through the network 200. Further, the file aging service server 300 may be connected to the content upload server 400 through the network 200. The user terminal 100 may be connected to the content upload server 400 by way of the file aging service server 300.

Here, the network 200 means a connection topology capable of exchanging information between respective nodes such as terminals and servers, which may include Internet, LAN (Local Area Network), Wireless LAN, WAN (Wide Area Network), PAN (Personal Area Network), 3G, 4G, LTE, and Wi-Fi but is not limited thereto. Further, it is understood that the user terminal 100, the file aging service server 300 and the content upload server 400 disclosed in FIG. 1 are not limited to those illustrated in FIG. 1.

The user terminal 100 may be a terminal that uploads or transmits contents to websites, applications, messengers, and clouds, PCs, or E-mails. Specifically, the user terminal 100 may identify content uploaded or transmitted from a site that is hosted by the file aging service server 300. Further, the user terminal 100 may identify an extinction time of the content uploaded through the file aging service server 300. The user terminal 100 may also delete the uploaded content, delay or advance the extinction time of the content, or restore the content again. The user terminal 100 may be implemented by a terminal that may connect to servers or terminals at a remote location through the network 200. The user terminal 100 may be implemented by a computer that may connect to servers or terminals at a remote location through the network 200. Here, the computer may include, for example, a notebook computer, desktop computer, laptop computer or the like having a camera mounted therein. Further, the user terminal 100 may be implemented by a terminal that may connect to servers or terminals at a remote location through the network 200. The user terminal 100 may be a wireless communication device that ensures portability and mobility, for example, which may include any kind of handheld-based wireless communication device such as a handset for PCS (Personal Communication System), GSM (Global System for Mobile communication), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet), Smartphone, Smartpad, Tablet PC, or the like.

The file aging service server 300 may be a server that receives a content upload event from the user terminal 100 through the content upload server 400, and maps to the user terminal 100 an extinction time of the content contained in the content upload event to store a mapped result. By doing so, the file aging service server 300 may map the content uploaded by the user terminal 100 and websites, applications, messengers, clouds, PCs and E-mail servers in which the uploaded content is located. Further, when the extinction time of the content comes near, the file aging service server 300 may inform the user terminal of the extinction time of the content by transmitting an extinction notice message of the content to the user terminal 100. In this regard, upon receiving an extinction rejuvenation message of the content from the user terminal 100 in response to the extinction notice message, the file aging service server 300 may output a de-aging signal of the content. In the meantime, upon receiving an extinction confirmation message of the content from the user terminal 100, the file aging service server 300 may transmit a content extinction signal to at least one site or the content upload server 400 to allow the deletion of the relevant content. Accordingly, the file aging service server 300 may enable a user of the user terminal 100 to identify in one site as to whether what content which site or terminal stores. Furthermore, the file aging service server 300 may allow the user to set a lifecycle of contents, and identify whether a lifecycle-expired content should be deleted to thereby decrease junk data on website and protect personal literacy works. The file aging service server 300 may be implemented by a computer device that may connect to server or terminals at a remote location through the network 200. Here, the computer device may include, for example a notebook computer, desktop computer, laptop computer or the like having a camera mounted therein.

The content upload server 400 may be at least one of a messenger service server, social network service server, Internet service server, text message service server, cloud service server and mail service server. The content upload server 400 may be a server that connects to the user terminal 100 and uploads or stores the content. Particularly, the content upload server 400 may transmit the de-aging signal or content extinction signal to the file aging service server 300. Accordingly, the content upload server 400 enables the content not to be deleted when it receives the de-aging signal, and enables the content to be deleted when it receives the content extinction signal. The content upload server 400 may be implemented by a computer device that may connect to servers or terminals at a remote location through the network 200. The content upload server 400 may be implemented by a terminal that may connect to servers or terminals at a remote location through the network 200.

Figure 2:
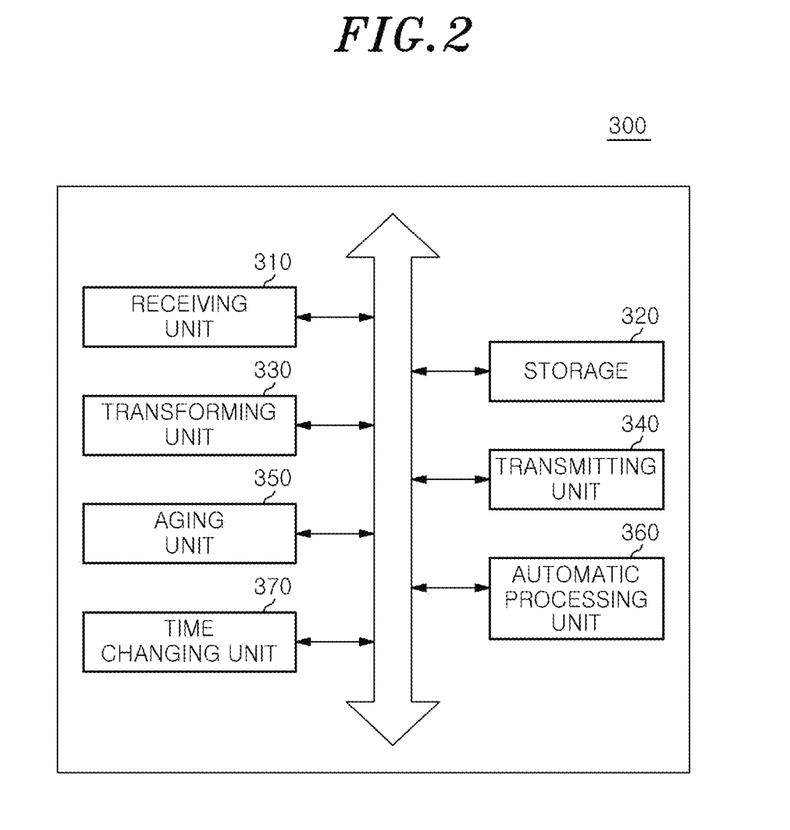
FIG. 2 is a block diagram illustrating the file aging service server illustrated in FIG. 1.

FIG. 2 is a block diagram illustrating the file aging service server illustrated in FIG. 1, and FIGS. 3A to 3G are diagrams illustrating an embodiment in which a file aging service served through FIG. 1 is driven in a website and a user terminal.

Referring to FIG. 2, the file aging service server 300 may include a receiving unit 310, a storage 320, a transforming unit 330, a transmitting unit 340, an aging unit 350, an automatic processing unit 360, and a time changing unit 370.

When the file aging service server 300 or another server (not shown) that interworks with the file aging service server 300 transmits to the user terminal 100 or the content upload server 400 an application, program or web page for providing a file aging service, the user terminal 100 or the content upload server 400 may install or open the application, program or web page for the file aging service. Further, a file aging service program may be driven in the user terminal 100 or the content upload server 400 using scripts implemented in a web browser. Here, the web browser refers to a program that enables a web (WWW: World wide web) service to be used, which means a program that receives and shows a hypertext scripted in HTML (Hyper Text Mark-up Language), and may include Netscape, Explorer and Chrome, for example. Further, the application means an application program on a terminal, for example, including an application program (app.) executed on a mobile terminal (smart phone). The app. may be installed by downloading it from a mobile application market being a virtual market where mobile contents are freely dealt in.

In addition, the connection to the network 200 means an interconnection among the terminal 100, the file aging service server 300, and the content upload server 400 that are in communication with one another. Further, the establishment of the connection to the network 200 means that the file aging service server 300 generates a communication object at a communication connection point in order to communicate with terminals which are connected through the network 200. The file aging service server 300 may exchange data one another through the communication object.

The receiving unit 310 may receive the content upload event from the user terminal 100 through the content upload server 400. The content upload event may include as meta information an identification number of the user terminal 100, ID and password information of the user terminal 100, URL information having a reference to an uploaded content, and information about the extinction time of the content indicating when the uploaded content become extinct. For example, the ID and password information of the user terminal 100 may include ID and password of a site where the contents are present. In addition, the ID and password information may also include ID and password of a site that is hosted by the file aging service server 300. In order to discriminate between them, the ID and password may be tagged with a tag or meta information, identifying to which site or application they belong.

Figure 3A:
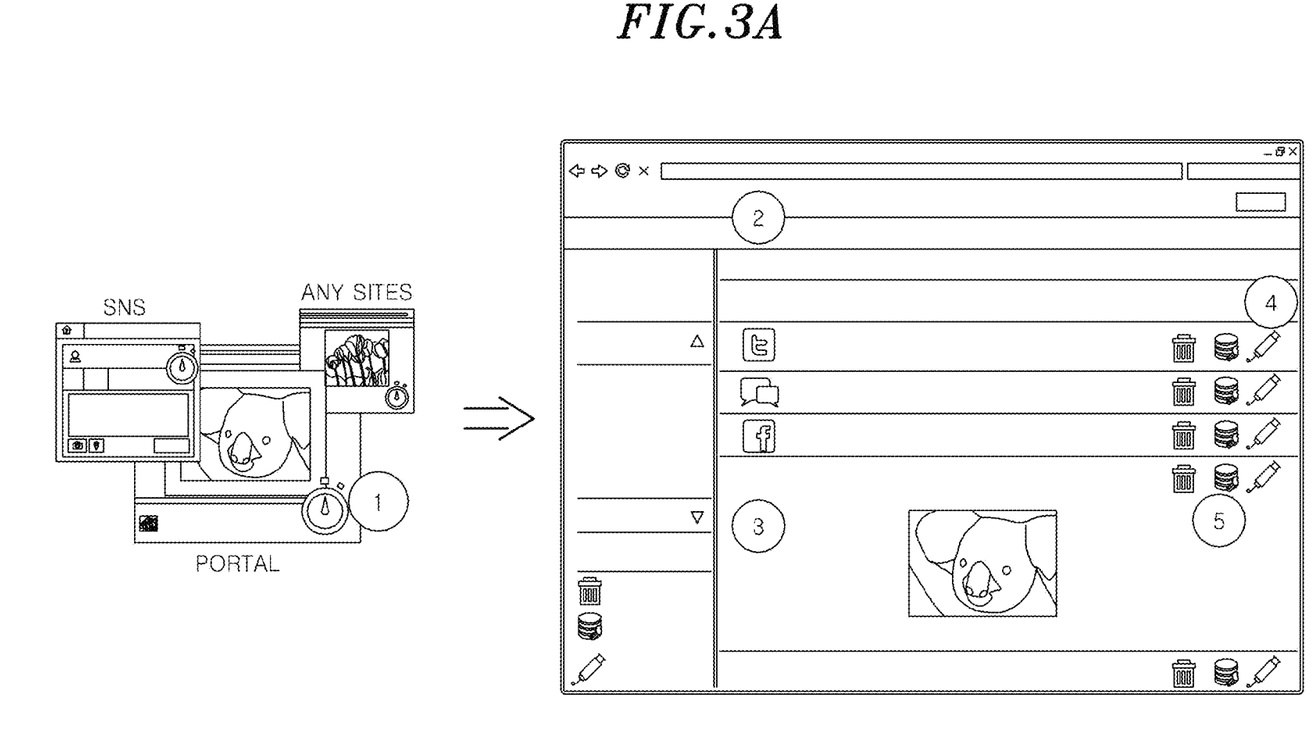
FIGS. 3A to 3G are diagrams illustrating embodiments in which a file aging service served through FIG. 1 is driven in a website and a user terminal.

The storage 320 may store a mapping of the extinction time of the content included in the content upload event to the user terminal 100. In this connection, the storage 320 may post the content uploaded by the user terminal and the extinction time of the content on the site which is hosted by the file aging service server 300. As illustrated in FIG. 3A, for example, the content and the extinction time of the content may be overlay-displayed on a user interface as follows: (1) when there exist files or texts uploaded by the user terminal 100 on a social network, portal site or other sites, (2) on the site hosted by the file aging service server 300, (3) when files or texts are listed up and displayed, (4) on a user interface which allows the restoration of the content according to an answer message from the user terminal 100, and (5) on a user interface which allows the deletion of contents according to a extinction time of the contents. At this time, (1) a timer used to set the extinction time of the contents through the user terminal 100 may be provided in a social network, portal site or other sites. Further, (2) the site hosted by the file aging service server 300 may provide a service to integrally check content of the user terminal 100 distributed in each site, and an environment to manage a lifecycle of the content. Further, (3) the user of the user terminal 100 may identify an aging process of the contents according to the content's lifecycle set by the user using a user interface. Furthermore, (4) the site hosted by the file aging service server 300 may provide an environment in which a user of the user terminal 100 can change, store or restore a extinction time of the content uploaded by the user, and (5) a site hosted by the file aging service server 300 may manage the content by informing the user terminal 100 that an extinction time of the content comes near.

Referring to FIG. 2 again, the transforming unit 330 may output the aging signal of the content based on a time difference between the extinction time of the content and a current time to transform the content. For example, a transformation degree of the content may correspond to the time difference between the extinction time of the content and the current time. At this time, the aging signal for the content may be transmitted to at least one site and the content upload server 400. Further, the aging signal for the content may be one to control at least one of fading, scratching, noise and transparency with respect to a user interface to display the content. For example, the content upload server 400 may be at least one of a messenger service server, a social network service server, an Internet service server, a text message service server, a cloud service server and a mail service server. Further, the content upload server 400 may provide the user terminal 100 with a user interface corresponding to a timer that may be used to set the extinction time of content when the content is uploaded by the user terminal 100. Furthermore, the content upload server 400 may transform the content in accordance with the aging signal.

The transmission unit 340 may transmit the extinction notice message of the content to the user terminal 100 within a preset time period from an extinction time of the content. At this time, the file aging service server 300 may provide at least one site to display content uploaded to the content upload server 400 and the extinction time of the content. The aging unit 350 may receive an answer message to the extinction notice message of the content from the user terminal 100. In case where the answer message is an extinction rejuvenation message of the content, the aging unit 350 outputs a de-aging signal of the content. In case where the answer message is an extinction confirmation message of the content, the aging unit 350 transmits an extinction message of the content to at least one site and the content upload server 400 so that the content can be deleted. As used herein, the de-aging signal of the content may be any of an extinction time changing signal of the content that allows delaying the extinction time of the content, a content storage signal that allows storing the content in the user terminal 100 or the content upload server 400, or an extinction time resetting signal that allows resetting the extinction time of the content. At this time, the content upload server 400 and the file aging service server 300 may implement a synchronization of the contents uploaded at the extinction time.

The automatic processing unit 360 may receive from the user terminal 100 an ID and password for accessing the content upload server 400 by the user terminal 100 via the content upload server 400, or directly receive the ID and password of the user terminal 400 from the content upload server 400. Further, the automatic processing unit 360 may map the received ID and password to the user terminal 100 and the content upload server 400 which is accessed by the ID and password to store a mapped result. When receiving an answer message in response to the extinction notice message of the content from the user terminal 100, the automatic processing unit 360 outputs a de-aging signal of the content if the answer message is the extinction rejuvenation message; and outputs the extinction signal of the content if the answer message is the extinction confirmation message. In this regard, the automatic processing unit 360 may search a site hosted by the content upload server 400 for a user interface used to input ID and password, for example, using an image identification algorithm. As an example, the automatic processing unit 360 may extract coordinate values of the user interface to input the ID and password from the site hosted by the content upload server 400 and coordinate values corresponding to a screen size and a screen magnification of the user terminal 100, thereby searching the user interface. For example, when it is assumed that an arbitrary site is searched for, coordinate values of a box (a user interface) to input the ID and password may be extracted by scanning the site in the form of an image and reading texts of the scanned image. Here, a method may be used to extract a box type template using an image template and read coordinates of a corresponding template. In this case, since the coordinate values may be changed due to diversity of screen sizes and screen magnifications of the user terminal 100, the coordinate values may be changed to adapt to various kinds of screen sizes and screen magnifications. Thereafter, the automatic processing unit 360 may restore the extinction state by inputting the received ID and password into the searched user interface used to input the ID and password and make de-aging of the content uploaded by the user terminal 100, otherwise automatically extinct the content uploaded by the user terminal 100.

The timing changing unit 370 may receive a search event for the content uploaded by the user terminal 100 from the content upload server 400, and change the extinction time of the content based on the received search event. At this time, the extinction time of the content becomes delayed as the number of searches included in the search event becomes increased, and the extinction time of the content becomes advanced as the number of searches included in the search event becomes decreased. That is, it may be possible to accelerate aging of the content when the content is required by nobody or of no value, utilizing the database efficiently.

Herein below, by way of an example, an embodiment that a file aging service is driven on a messenger-based server will be described with reference to FIG. 3B.

Figure 3B:
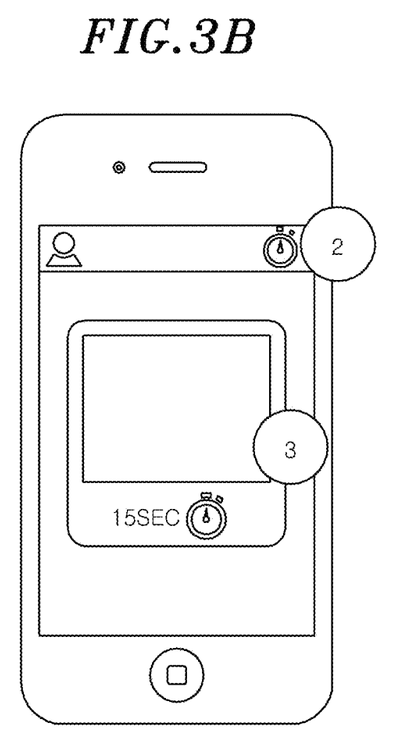
Figure 3C:
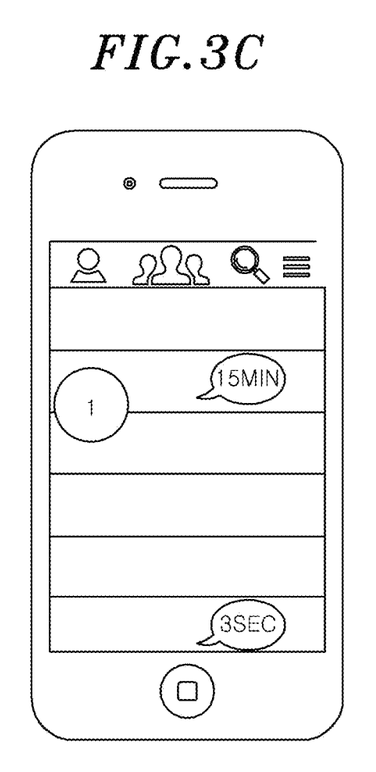
Figure 3D:
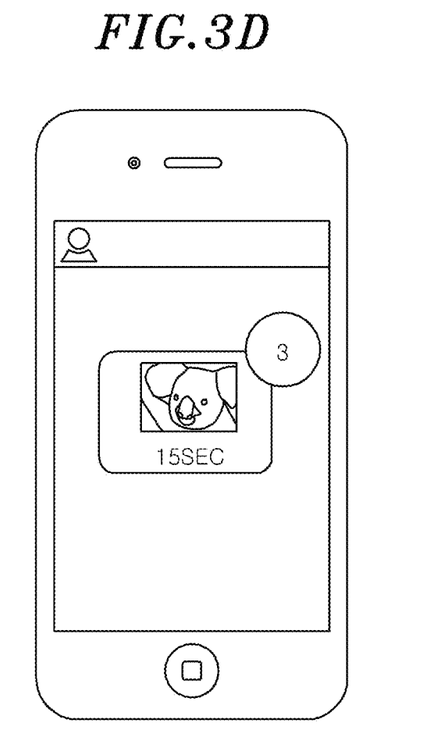

For example, when a text is uploaded by the user terminal 100 as illustrated in FIG. 3B, an extinction time of text may be set by the user terminal, and the file aging service server 300 may allow the text to be deleted (③ marked in FIG. 3B) so as not to be seen when the extinction time of the text expires. Further, the file aging service server 300 may preset a time to a chat room (② marked in FIG. 3B) in which a plurality of user terminals 100 participates so that the chat room may be remained only for the preset time. Further, even when chat rooms among the user terminals 100 are listed up, the extinction times (① marked in FIG. 3C) of the chat room may be displayed as illustrated in FIG. 3C. Furthermore, an aging progress of an image may be displayed using a user interface element as the extinction time of the image comes near as illustrated in FIG. 3D. Also, the image may be automatically deleted when an effective lifecycle expires. Additionally, in case where an extinction time is set for chat and shared contents registered by the user terminal 100 in the chat room, it may be possible to design that the user terminal 100, which has set the extinction time, controls operations such as copy and download of the content.

In summary, the file aging service server 300 may receive a chat participation event from a plurality of user terminals 100. Then, the file aging service server 300 may receive a content upload event from a user terminal 100 among the plurality of user terminals 100 and transmit the content included in the content upload event to the plurality of user terminals 100. The file aging service server 300 may count a time difference between the extinction time of the content included in the content upload event and a current time and transmit the counted time difference to the plurality of user terminals 100. At this time, when the extinction time of the content is identical to the current time, the file aging service server 300 may transmit the extinction time to the user terminals 100 so that the content can be deleted. In this case, the plurality of user terminals 100 may display the received and counted time difference in the form of a text, an image or a video. For example, the text may view to count a residual time, the image may view as a timer image and the video may view as a residual time that is counted while being overlaid on the timer image. Here, the file aging service server 300 may output the aging signal for the content to the plurality of user terminals 100 based on the time difference between the extinction time of the content and the current time to transform the content. The aging signal for the content may be a signal to control at least one of fading, scratching, noise and transparency of a user interface which displays the content.

An embodiment that a file aging service is driven on a PC (Personal Computer)-based server will be described with reference to FIGS. 3E to 3G.

Figure 3E:
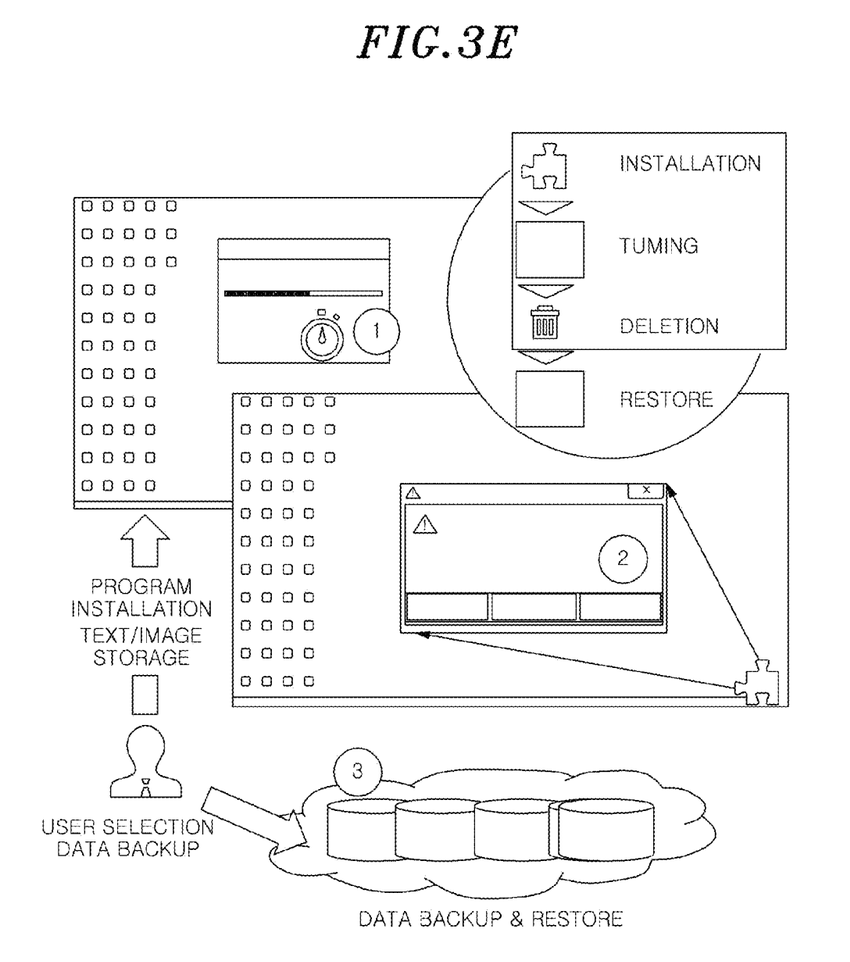

Referring to FIG. 3E, the file aging service server 300 may detect a storage event to operate a timer when a program is installed or a file is stored in a PC, and a user of the PC may set an extinction time of the program or file (① marked in FIG. 3E). Further, as the extinction time of the program or file comes near, the file aging service server 300 may provide an aging progress of the content using a user interface element. The file aging service server 300 may delete the installed program or file when it reaches the extinction time (② marked in FIG. 3E). Further, the file aging service server 300 may provide a cloud back-up function for the content according to a user opt-in, or a restore function for the deleted content.

Figure 3F:
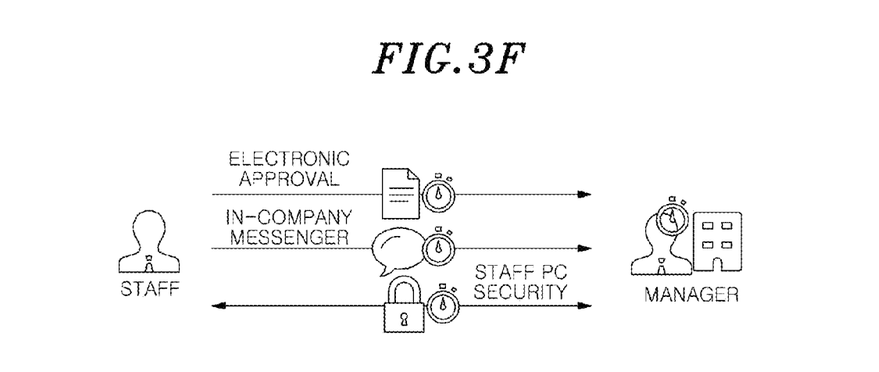
Figure 3G:
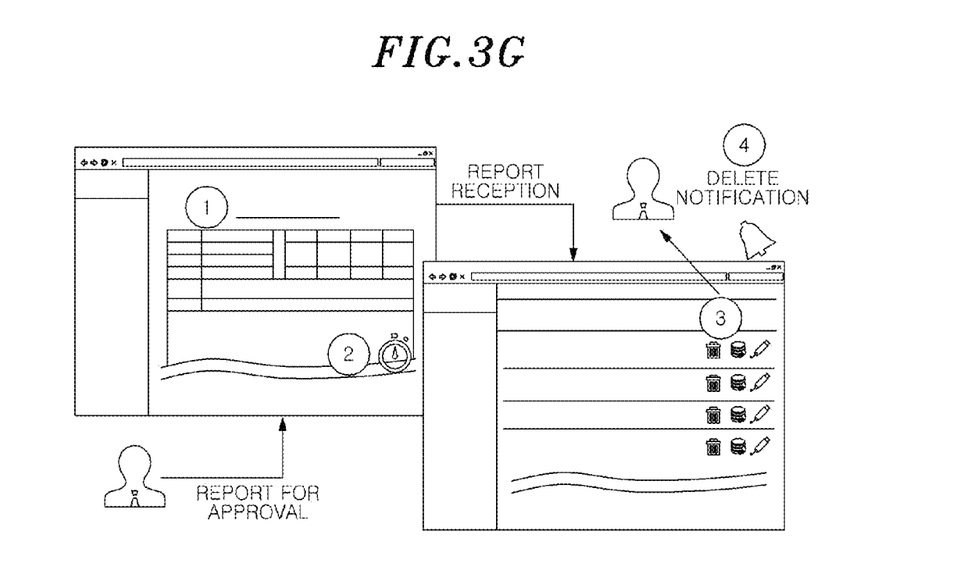

Referring to FIG. 3F, the file aging service server 300 interworks with a system such as an enterprise resource planning server used in an enterprise, messengers and security programs to provide an environment which enables monitoring and lifecycle management of content (① marked in FIG. 3F). For example, when staffs in an enterprise perform literary works or tasks, the file aging service server 300 may provide a timer function to set an extinction time of the relevant literary works (② marked in FIG. 3F), and may enable an aging progress based on the lifecycle of the literary works, which has been created and distributed, to be recognized intuitively using a user interface element. Further, the file aging service server 300 may provide an environment to change or restore an effective lifecycle for content including the literary works (③ marked in FIG. 3G); provide a manager with an alerting service when changing the effective lifecycle contents including the literacy works; and provide a function that a manager enables the deletion of the content at his or her pleasure (④ marked in FIG. 3G).

In summary, the file aging service server 300 may receive the content storage event from the user terminal 100 via the content upload server 400 or directly receive the storage event from the user terminal 100. The file aging service server 300 may then map the extinction time included in the content storage event to the user terminal 100 to store a mapped result, and transmit to the user terminal 100 the extinction notice message of the content within a preset time period from the extinction time. Further, the file aging service server 300 may receive an answer message in response to the extinction notice message of the content from the user terminal 100, output the de-aging signal of the content when the answer message is the extinction rejuvenation message and transmit the content extinction signal to the user terminal 100 when the answer message is the extinction confirmation message of the content to delete the content.

Further details of the method for providing a file aging service illustrated in FIGS. 2 and 3A to 3G will not be described below since they are similar or identical to the description made through FIG. 1 or can be easily inferred from the description.

Figure 4A:
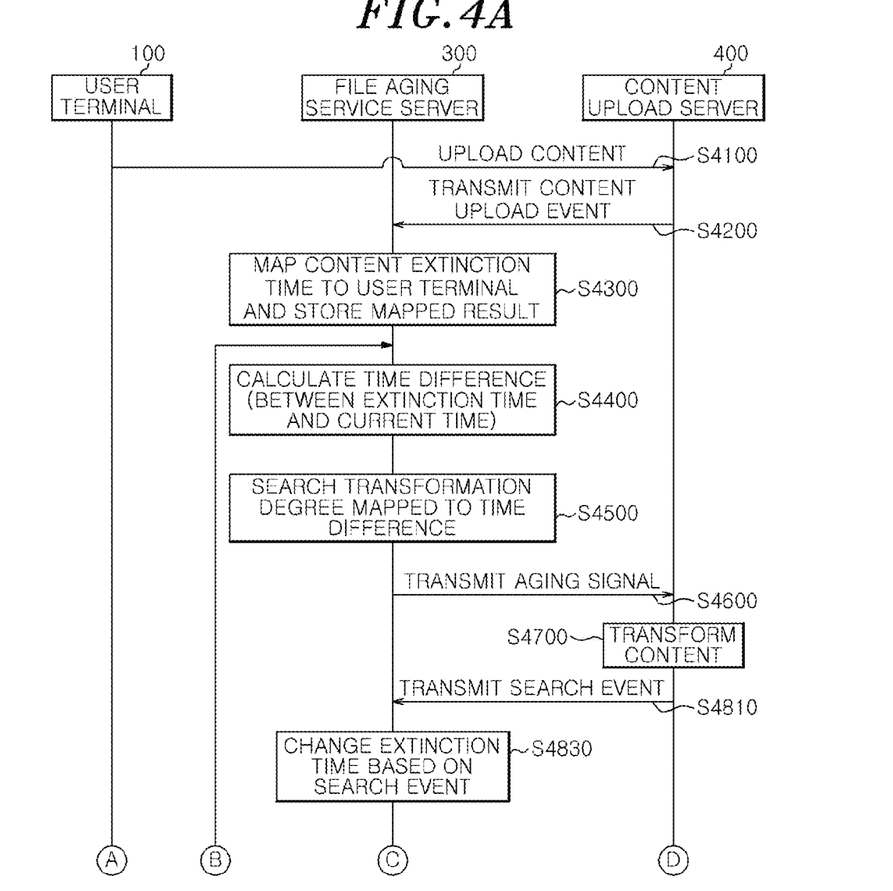
FIG. 4A to 4B are a sequential diagrams illustrating a data communication flow among components in the file aging service providing system of FIG. 1 in accordance with an embodiment of the present invention.
Figure 4B:
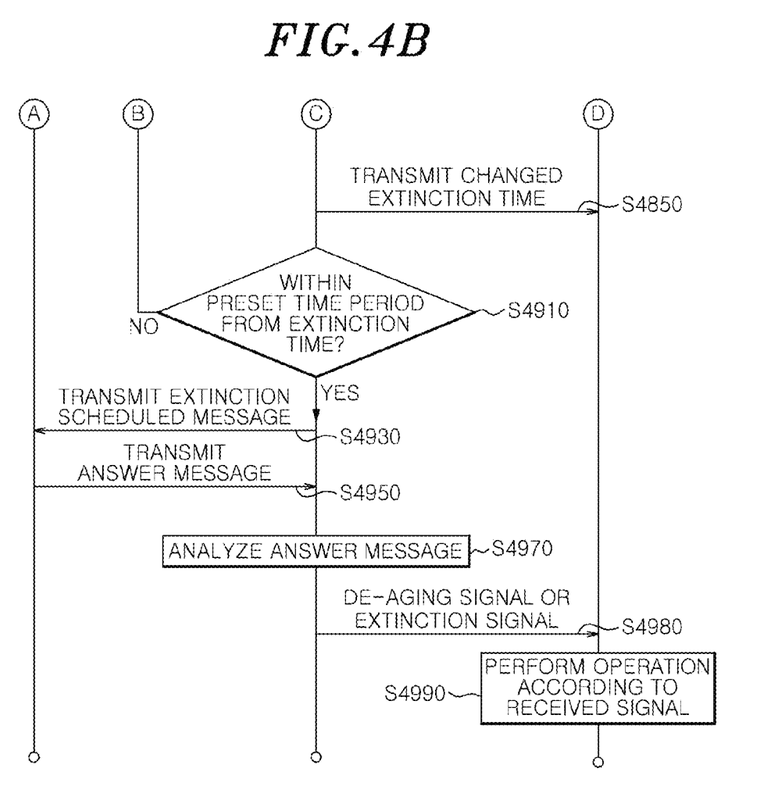

FIG. 4A to 4B are diagrams illustrating a data communication procedure performed among components in the file aging service providing system of FIG. 1 in accordance with an embodiment of the present invention. Hereinafter, while an example of a procedure to communicate signals in accordance with an embodiment of the present invention will be described with reference to FIG. 4A and FIG. 4B, the present invention will not be limited to this embodiment, and it will be apparent to those skilled in the art that the procedure to communicate signals as illustrated in FIG. 4 may be varied depending on various embodiments.

Referring to FIG. 4A and FIG. 4B, the user terminal 100 uploads content to the content upload server 400 at block S4100 and transmits the content upload event to the file aging service providing server 300 via the content upload server 400 at block S4200. The file aging service server 300 then maps the extinction time of the content to the user terminal and stores a mapped result at block S4300.

Next, the file aging service server 300 calculates a time difference between the extinction time of the content and a current time at block S4400, searches for a transformation degree mapped to the time difference at block S4500 and transmits the aging signal of the content based on the searched transformation degree to the content upload server 400 at block S4600. Accordingly, the content upload server 400 transforms the content based on the aging signal.

When the content upload server 400 transmits the search event to the file imaging service server 300, the file aging service providing server 300 changes the extinction time of content based on the search event at block S4830 and transmits the changed extinction time of the content to the content upload server 400 at block S4850.

In this case, the file aging service providing server 300 transmits the extinction notice message to the user terminal 100 when the current time is within the preset time period from the extinction time of the content at block S4910. Thereafter, upon receiving an answer message transmitted from the user terminal 100 at S4950, the file aging service server 300 analyzes the answer message at block S4970 and then transmits the de-aging signal or the content extinction signal to the content upload server 400 at block S4980. At this time, the content upload server 400 analyzes the de-aging signal or the extinction signal to carry out operations suitable for the respective signals at block S4990.

Further details of the method for providing a file aging service illustrated in FIG. 4A and FIG. 4B will not be described below since they are similar or identical to the description made through FIGS. 1. 2 and 3A to 3D or can be easily inferred from the description.

The order of the above operations described in blocks S4100 to S4990 is exemplary and the embodiment is not limited thereto. That is, the order of the operations described in blocks S4100 to S4990 may be mutually exchanged, and some of these operations may be simultaneously executed or partially removed.

Figure 5:
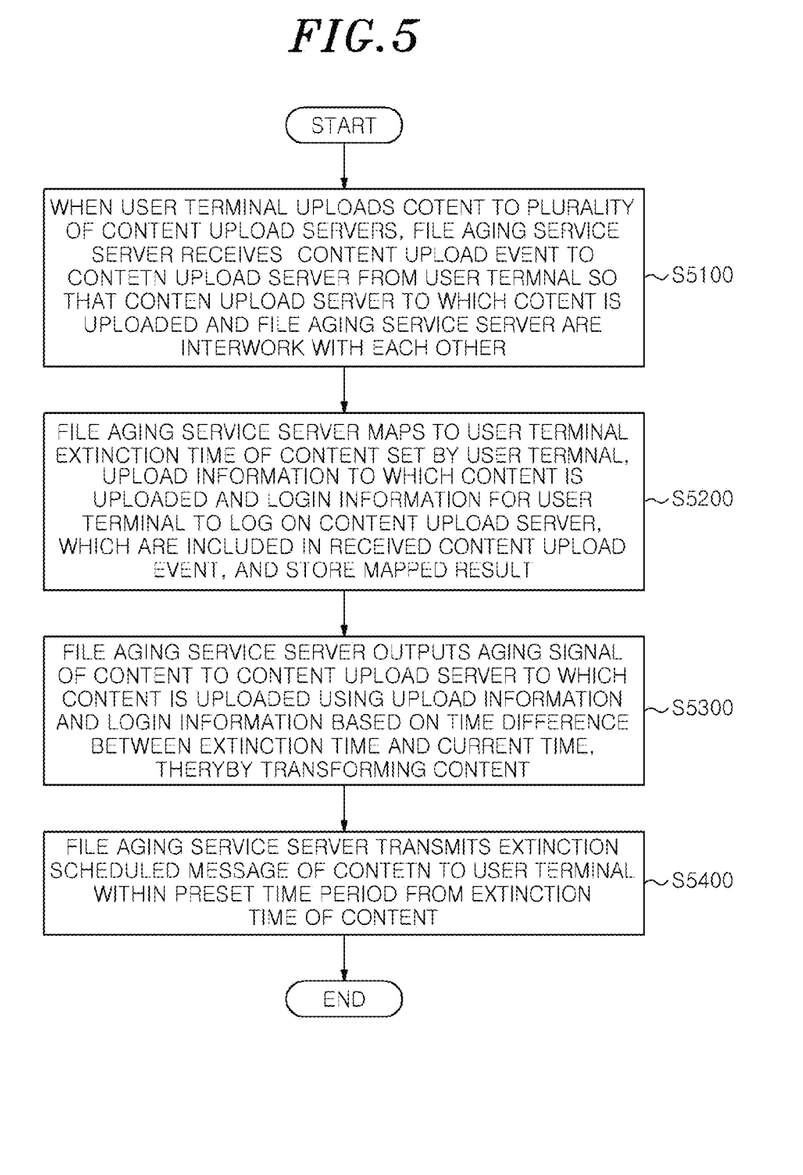
FIG. 5 is a flow diagram illustrating a method for providing a file aging service in accordance an embodiment of the present invention.

FIG. 5 is a flow diagram illustrating a method for providing a file aging service in accordance an embodiment of the present invention. Referring to FIG. 5, the file aging service server receives the content upload event from the user terminal via the content upload server at block S5100.

Next, the file aging service server maps the extinction time of the content included in the content upload event to the user terminal and stores a mapped result at block S5200.

The file aging service server outputs the aging signal of the content, which allows transforming the content, based on a time difference between the extinction time and a current time at block S5300.

The file aging service server transmits the extinction notice message to the user terminal within a preset time period from the extinction time at block S5400.

Further details of the method for providing a file aging service illustrated in FIG. 5 will not be described below since they are similar or identical to the description made through FIG. 1 to 4 or can be easily inferred from the description.

The method for the method for providing a file aging service of the embodiment described in FIG. 5 may be implemented in the form of recording media including instructions executable by a computer, such as applications or program modules that are executed by a computer. A computer readable media may be any available media that can be accessed by a computer and may include volatile and nonvolatile media, and removable and non-removable media. Further, the computer readable media may include any computer storage media and communication media. The computer storage media may include any volatile and nonvolatile media and removable and non-removable storage media that are implemented in any methods or technologies for the storage of information such as data and computer-readable instructions, data structures, program modules, or other data. The communication media may include a transport mechanism or any information delivery media for transmitting computer readable instructions, data structures, program modules or other data of modulated data signal such as carrier waves.

The method for providing a file aging service of the embodiments described above may be executed by the applications installed on the terminal by default (which may be programs included in the platform or operating system that are mounted on the terminal by default) or may be executed by applications (i.e., the programs) that are installed directly on the terminal by the user through an application storing server or an application providing server such as a Web server associated with the applications or related services. In this sense, the method of the embodiment of the present invention may be recorded on a computer-readable recording medium that may be implemented with the applications (i.e., the programs) that are mounted on the terminal by default or installed directly on the terminal by the user.

Description of the present invention as mentioned above is intended for illustrative purposes, and it will be understood to those having ordinary skill in the art that this invention can be easily modified into other specific forms without changing the technical idea and the essential characteristics of the present invention. Accordingly, it should be understood that the embodiments described above are exemplary in all respects and not limited thereto. For example, respective components described to be one body may be implemented separately from one another, and likewise components described separately from one another may be implemented in an integrated type.

The scope of the present invention is represented by the claims described below rather than the foregoing detailed description, and it should be construed that all modifications or changes derived from the meaning and scope of the claims and their equivalent concepts are intended to be fallen within the scope of the present invention.

What is claimed is:

1. A method for providing a file aging service in a file aging service server, the method comprising:

when a user terminal uploads content to at least one content upload server, receiving, by the file aging service server, a content upload event from the user terminal through the at least one content upload server, so that the content upload server to which the content is uploaded and the file aging service server can interwork with each other;

storing, by the file aging service server, an extinction time of the content set by the user terminal, which is contained in the content upload event, upload information indicating where the content is uploaded and login information for the user terminal to log on to the content upload server the extinction time of the content, the upload information and the login information being mapped with an identification number of the user terminal;

outputting, by the file aging service server, an aging signal of the content to the content upload server to which the content is uploaded through the use of the upload information and the login information based on a time difference between the extinction time of the content and a current time, so that the content is transformed; and transmitting, by the file aging service server, an extinction notice message of the content to the user terminal within a preset time period from the extinction time of the content, wherein the content upload server transforms the content in accordance with the outputted aging signal.

2. The method of claim 1, wherein the file aging service server provides at least one site to display the content uploaded to the content upload server and the extinction time of the content.

3. The method of claim 2, further comprising:
receiving an answer message from the user terminal in response to the extinction notice message of the content; and
outputting a de-aging signal of the content when the answer message is a content extinction rejuvenation message, and transmitting an extinction signal of the content to the at least one site and the content upload servers to delete the content when the answer message is a content extinction confirmation message.

4. The method of claim 3, wherein the de-aging signal of the content is an extinction time changing signal of the content to delay the extinction time of the content, a content storage signal to store the content in the user terminal or the content upload server, or an extinction time resetting signal to reset the extinction time of the content.

5. The method of claim 2, wherein the aging signal of the content is transmitted to the at least one site and the content upload servers, and
wherein the aging signal of the content is used to control at least one of fading, scratching, noise and transparency of a user interface which displays the content.

6. The method of claim 1, wherein the content upload server is at least one of a messenger service server, a social network service server, an Internet service server, a text message service server, a cloud service server, and a mail service server.

7. The method of claim 1, further comprising:
receiving an ID and a password with which the user terminal accesses the content upload server from the user terminal through the content upload server, or receiving the ID and password of the user terminal from the content upload servers;
mapping the received ID and password to the user terminal and the content upload servers which are accessed by the use of the received ID and password to store the mapped result;
receiving an answer message to the extinction notice message of the content from the user terminal;
outputting a de-aging signal of the content when the answer message is a content extinction rejuvenation message, or otherwise outputting the extinction signal of the content when the answer message is a content extinction confirmation message;
searching a user interface through which an ID and a password are inputted to a site that is provided by the content upload server using an image recognition algorithm;
inputting the searched ID and password through the user interface; and
de-aging the content uploaded by the user terminal to restore an extinct state of the content or to automatically delete the content uploaded by the user terminal.

8. The method of claim 7, wherein said searching a user interface is performed by:
extracting coordinates of the user interface that inputs the ID and password from the site that is provided by the content upload server; and
controlling coordinates corresponding to a screen size and a screen magnification of the user terminal.

9. The method of claim 1, wherein the content upload server provides the user terminal with a timer that is used to set the extinction time of the content and a user interface corresponding to the timer when uploading the content from the user terminal.

10. The method of claim 1, wherein the content upload server and the file aging service server perform a synchronization of the uploaded contents at the extinction time of the content.

11. The method of claim 1, wherein a transformation degree of the content corresponds to the time difference between the extinction time of the content and a current time.

12. The method of claim 1, further comprising:
receiving a search event for the content that has been uploaded by the user terminal from the content upload server; and
changing the extinction time of the content based on the received search event,
wherein the extinction time of the content becomes delayed as the number of searches included in the search event becomes increased, and the extinction time of the content becomes advanced as the number of searches included in the search event becomes decreased.

13. A method for providing an application that interworks with a file ageing service server, which performs a method for providing a file aging service, which is characterized in that:
the application is provided from the file aging service server or a mobile market that is cooperated with the file aging service server; and
the file aging service server performs the method of claim 1.

14. A method for providing a file aging service in a file aging service server, the method comprising:
receiving, by the file aging service server, a-dialogue participation events from plurality of user terminals, respectively, wherein the dialogue participation events indicate that user terminals join a chat room provided by content upload server from the plurality of user terminals;
when a user terminal of among the plurality of user terminals uploads content to the content upload server, receiving, by the file aging service server, a content upload event including the uploaded content to interwork the content upload server to which the content is uploaded and the file aging service server;
transmitting, by the file aging service server, the content included in the received content upload event to the plurality of user terminals connected to the content upload server;
counting, by the file aging service server, a time difference between an extinction time of the content included in the received content upload event and a current time to transmit the counted time difference to the plurality of user terminals connected to the content upload server; and
when the extinction time of the content is identical to the current time, transmitting, by the file aging service server, an extinction signal of the content to the content upload server to delete the content from the plurality of user terminals, so that the content can be is deleted from the plurality of user terminals.

15. The method of claim 14, wherein the plurality of user terminals displays the counted time difference in the form of a text, an image or an image.

16. The method of claim 14, further comprising:
outputting an aging signal of the content to the plurality of user terminals to transform the content based on the time difference between the extinction time of the content and the current time,
wherein the aging signal of the content is used to control at least one of fading, scratching, noise and transparency of a user interface to display the content.

17. A method for providing an application that interworks with a file ageing service server, which performs a method for providing a file aging service, which is characterized in that:
the application is provided from the file aging service server or a mobile market that is cooperated with the file aging service server; and
the file aging service server performs the method of claim 14.

18. A method for providing a file aging service in a file aging service server, the method comprising:
when a user terminal stores content in a plurality of content upload servers, receiving, by the file aging service server, a content storage event of the user terminal in each of the content upload servers so that the content upload server in which the content is stored and the file aging service server interwork with each other;
mapping, by the file aging service server, to the user terminal an extinction time of the content set by the user terminal, which is included in the received content storage event, storage information indicating where the content is stored and login information for the user terminal to log on the content upload server, and storing the mapped result;
outputting, by the file aging service server, an aging signal of the content to the content upload server in which the content is stored through the use of the storage information and the login information based on a time difference between the extinction time of the content and the current time, so that the content can be transformed;
transmitting, by the file aging service server, an extinction notice message of the content to the user terminal within a preset time period from the extinction time;
receiving, by the file aging service server, an answer message to the extinction notice message from the user terminal; and
outputting, by the file aging service server, a de-aging signal of the content to the content upload server to which the content is uploaded using the storage information and the login information to restore the transformed content when the answer message is a content extinction rejuvenation message, and transmitting the content extinction signal to the content upload server to which the content is uploaded using the storage information and the login information to delete the transformed contents when the answer message is a content extinction confirmation message.

19. A method for providing an application that interworks with a file ageing service server, which performs a method for providing a file aging service, which is characterized in that:
the application is provided from the file aging service server or a mobile market that is cooperated with the file aging service server; and
the file aging service server performs the method of claim 18.

* * * * *